US009094670B1

(12) United States Patent
Furio et al.

(10) Patent No.: US 9,094,670 B1
(45) Date of Patent: Jul. 28, 2015

(54) MODEL GENERATION AND DATABASE

(71) Applicant: Amazon Technologies, Inc., Reno, NV (US)

(72) Inventors: Paul J. Furio, Seattle, WA (US); Kesler Williams Tanner, Springville, UT (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 334 days.

(21) Appl. No.: 13/626,620

(22) Filed: Sep. 25, 2012

(51) Int. Cl.
*H04N 13/00* (2006.01)
*H04N 13/02* (2006.01)

(52) U.S. Cl.
CPC .................................. *H04N 13/0203* (2013.01)

(58) Field of Classification Search
CPC .......... H04N 13/0239; H04N 13/0296; H04N 13/0055; H04N 2013/0081; G06T 7/0022
USPC .......................................................... 348/47
See application file for complete search history.

(56) References Cited

U.S. PATENT DOCUMENTS

| 5,819,016 | A  | * | 10/1998 | Watanabe et al. ............. 345/419 |
| 8,059,889 | B2 | * | 11/2011 | Kobayashi et al. ............ 382/154 |
| 8,416,236 | B1 | * | 4/2013 | Hickman et al. .............. 345/419 |
| 2004/0089962 | A1 | * | 5/2004 | Valery et al. .................... 264/16 |
| 2011/0227924 | A1 | * | 9/2011 | Nakajima et al. ............. 345/427 |
| 2012/0281873 | A1 | * | 11/2012 | Brown et al. .................. 382/103 |

OTHER PUBLICATIONS

Seitz et al. A Comparison and Evaluation of Multi-View Stereo Reconstruction Algorithms, CVPR 2006, vol. 1, pp. 519-526.*
Zheng et al. "Interactive Images: Cuboid Proxies for Smart Image Manipulation"; ACM Trans. Graph. 31 4, Article 99 (Jul. 2012).*

* cited by examiner

*Primary Examiner* — Jay Patel
*Assistant Examiner* — Frank Huang
(74) *Attorney, Agent, or Firm* — Novak Druce Connolly Bove + Quigg LLP (57) ABSTRACT

Various embodiments enable a user to capture image information with one or more cameras of a computing device for generating a three-dimensional model of an object and further to enable subsequent users to refine the model by submitting additional image information. For example, an ecommerce service could receive image information from a user for a product offered for sale that was captured with a computing device. With the image information, the service can generate a three-dimensional model of the product and provide the model for display through a website for customers interested in the product to view.

24 Claims, 7 Drawing Sheets

MODEL GENERATION AND DATABASE

BACKGROUND

People are increasingly interacting with computers and other electronic devices in new and interesting ways. For example, users attempting to sell products through an online retailer can upload images of the products for viewing thereof. In some instances, individual sellers (users) may sell items within a larger online retailer environment. In these environments, there is often an overlap of products offered by sellers with each seller submitting their own product image, which results in many images of varying quality representing the same product. Since portable computing devices are increasingly offering multiple high quality cameras that enable additional types of functionality, such as three-dimensional (3D) image capture for both still and video imaging, it can be advantageous to adapt not just how images are uploaded by sellers, but also how customers viewing the products can interact with the same.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to generating image models of objects. In particular, various approaches enable a user to capture image information with one or more cameras of a computing device to generate an image model of an object and, further, to enable subsequent users to refine the model by submitting additional image information. For example, an ecommerce service could receive user submitted image information captured of a product offered for sale. With the image information, the service can generate a three-dimensional (3D) model, or a quasi-3D model on a two-dimensional display, of the product and provide the model for display through a website for customers interested in the product to view. If the image information is not complete or does not meet a quality threshold, the service could prompt subsequent users with devices having sufficient imaging capabilities to provide additional image information by capturing additional views, or additional image information for poorly generated areas, of the product. For example, the model may include side and top views of the product, but be missing front and back views. The service could, therefore, prompt a subsequent user to provide the front and back views to further refine and complete the model. In another example, the model could be blurry, contain an image defect, or inconsistent lighting variation from a certain angle. In this example, subsequent users could be prompted in order to improve the quality of the model when viewed from that angle.

In order to generate and refine an image model, in accordance with at least one embodiment, objects, such as products for sale on an ecommerce website, are given a unique identifier that is correlated with a plurality of user submitted images. The submitted images are auto-correlated to collectively produce a 3D model of the object for display on a website. In at least one embodiment, users can submit images taken with a computing device and contribute to, for example, a 3D object model Wiki or database where unique object identifiers are mapped to specific 3D models. As more users contribute to the Wiki, the numbers of available models will grow and the overall quality of the models will increase as additional instances (pieces or images) of a model are auto-correlated therewith. The Wiki can also be made available to third parties allowing a model to be downloaded and imported into various applications.

Various other functions and advantages are described and suggested below as may be provided in accordance with the various embodiments.

Figure 1:
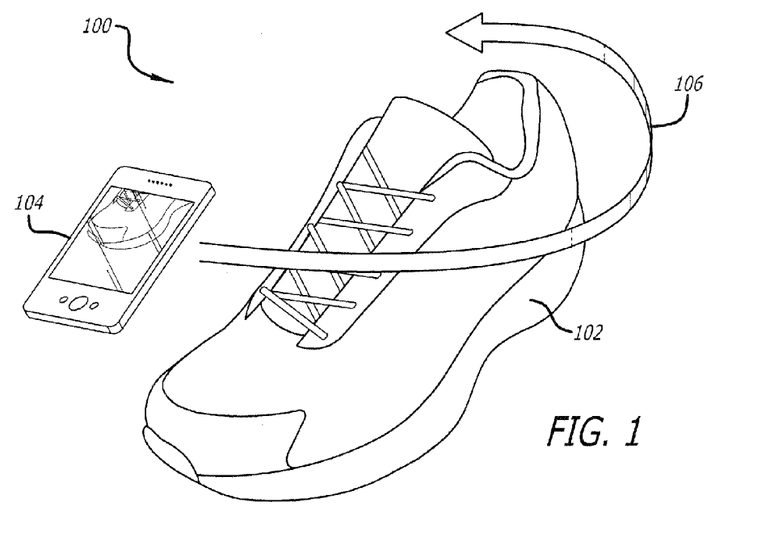
FIG. 1 illustrates an example situation showing a user capturing images of an object with a computing device in accordance with at least one embodiment.

FIG. 1 illustrates an example situation 100 in which a user is capturing images of a product 102 in order to build a three-dimensional (3D) image model thereof. Using an appropriate application executing on a computing device 104, the user is able to obtain images (or video) of the product 102, which is a shoe in this example, by positioning the computing device 104 such that the shoe is within a field of view of one or more cameras on the computing device 104. Although a smart phone is shown, it should be understood that various other types of electronic or computing devices that are capable of determining and processing input can be used in accordance with various embodiments discussed herein. These devices can include, for example, tablet computers, notebook computers, desktop computers with a movable camera, personal data assistants, electronic book readers, video gaming controllers, and portable media players, among others. In various embodiments, the one or more cameras on the computing device 104 are capable of capturing 3D or stereoscopic image information of the product 102. In order to generate a complete model, a user may capture image information of the product 102 from multiple angles 360 degrees around the product 102. This is represented by the motion arrow 106, where each hash mark, in one example, represents an angle location where a user may capture an image. Alternatively, the images could be captured in a stream of video with many image frames capturing images from incrementally small angle variation between adjacent frames. In some instances, this includes capturing images of the top, bottom, front, back, and both sides of the shoe, in this example, or a portion thereof. The image information is correlated with a unique identifier assigned to the product 102, such as the product's barcode or other recognition tool, to map the image information to the product 102 and a 3D image model is generated. Other recognition could be a QR code, a product identifier, text recognized using an optical character recognizer, or by image information associated with the item, and the like. The model can then be provided to, for example, a listing on an ecommerce website for display thereon, thus, enabling customers of the ecommerce website to view the product from any angle or to the extent the model allows or is complete.

Figure 2A:
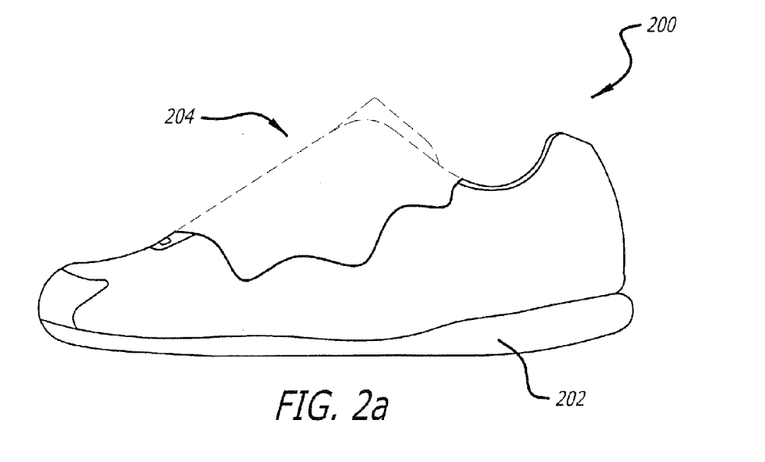
FIGS. 2(a) and 2(b) illustrate an example before and after illustration of an object in accordance with at least one embodiment.
Figure 2B:
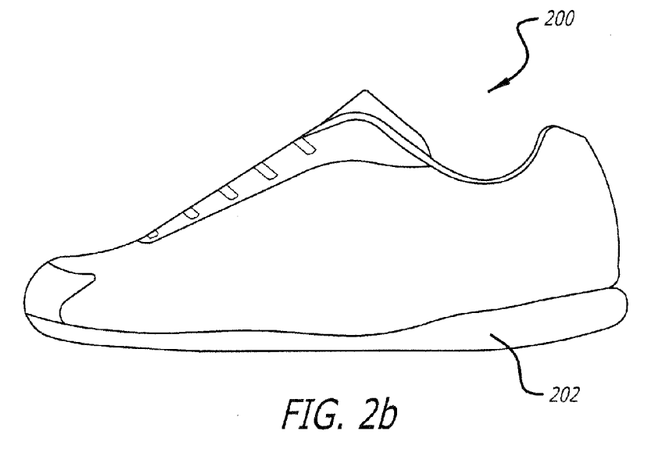

In some instances, corporations (or other affiliated entities) may provide the 3D models for their products for sale on an ecommerce website. For products without provided models or for previously owned items, for example, the teachings described herein enable one or more users to provide the images for generating the models. In this manner, any person in possession of a computing device with imaging capability can capture images of a product or item and upload the images for model generation. Since virtually any user could upload images, the quality, or completeness of a set of images, for generating a full 3D model is not always sufficiently adequate. Therefore, in accordance with various embodiments, a model generated by a first set of images submitted by a user can be updated or refined by the submission of additional images from the user or subsequent users. In this example, the first set of images may have been incomplete, such as by missing certain views, which could have been either not submitted by the user, of poor quality, and the like. FIG. 2(a) illustrates an example model 200 of a product 202 that was generated with incomplete image information. In this example, the product 202 is missing an area 204 that corresponds to a portion of the top of the product 202, which again is a shoe. As briefly mentioned above, the missing or incomplete area 204 could have been caused by a user submitting an incomplete set of images, a set of image data points may have been incomplete, resolution inconsistencies may be present, and the like. In this instance, the user could have forgotten to submit or capture the top image or the top image could have been blurry or contained a lighting variation that did not transfer well when the model was generated. The deficiency of the originally submitted images, however, can be remedied by the submission of additional images of the model either from the user and/or from other subsequent users. Therefore, the missing or incomplete area 204 can be filled or completed and this is illustrated by the completed model 200 shown in the example of FIG. 2(b).

Figure 3A:
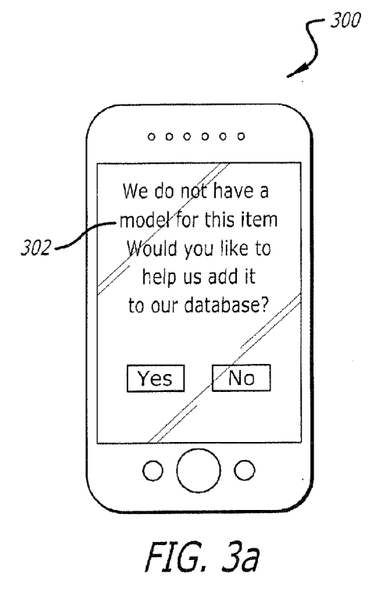
FIGS. 3(a)-3(d) illustrate multiple example screen shots of a computing device in accordance with at least one embodiment.
Figure 3B:
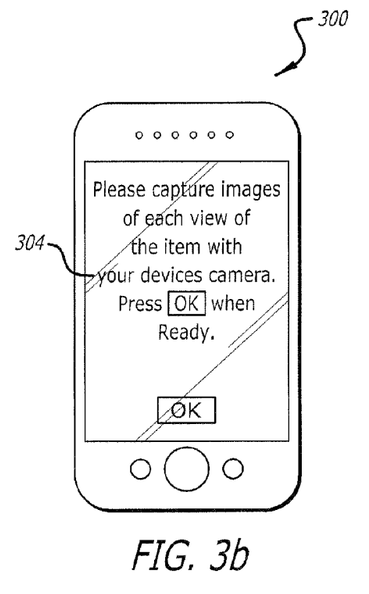
Figure 3C:
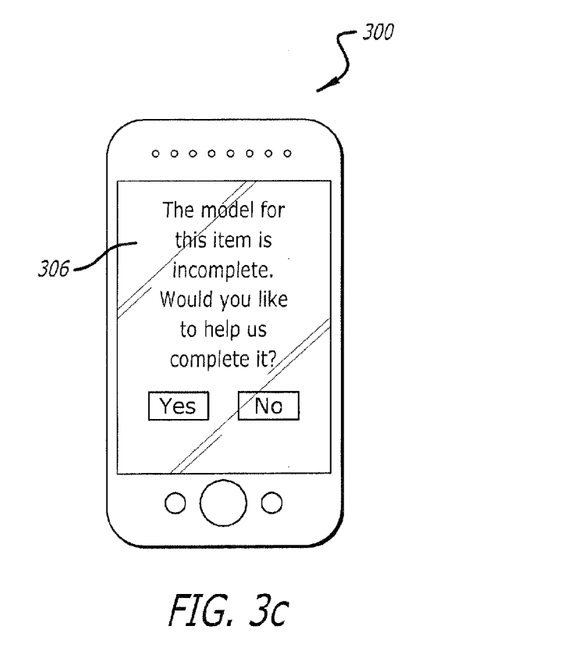

FIGS. 3(a)-3(d) illustrate example screen shots of a computing device 300, in accordance with at least one embodiment. FIG. 3(a) illustrates a screen shot 302 presented to a user. As briefly mentioned above, the product could be for sale on an ecommerce website and the user could be a third party seller of items on the website. In this instance, the user has accessed a webpage associated with an online retailer via the computing device 300 and may have inputted information to make their product available to customers. However, upon searching for the item, via a bar code or other product identifier, the user is notified that there is no existing model for the instant item and is asked or prompted to add the item to the online retailer's database via the screen shot 302. In this example, the user subsequently accepts the offer and, in this example, is instructed by the computing device 300 to capture images of each view of the product as illustrates in screen shot 304 of FIG. 3(a). Accordingly, the user captures the requisite images and uploads the images to generate the model.

Figure 3D:
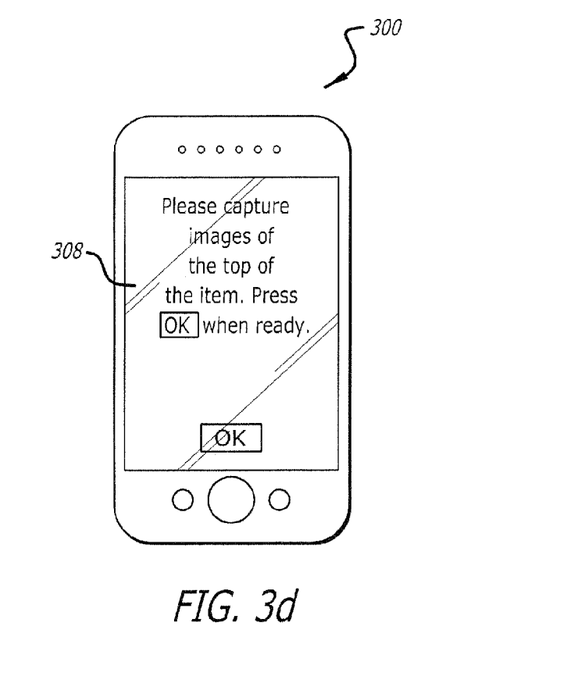

In one example, maybe the user did not capture all the necessary views as instructed by the computing device 300. Or, alternatively, the quality of at least one image from a certain view may not have transferred well when the model was generated. Therefore, referring now to FIG. 3(a), a subsequent user, who could be visiting a webpage or product posting for a particular item to, for example, write a product review or generate their own posting for the same product, is notified via screen shot 306 that the model for the product is incomplete and is prompted to help complete the model. In this example, the subsequent user accepts and is instructed, via screen shot 308 of FIG. 3(d), to capture an image of the incomplete area(s), which, in the example of FIG. 2(a), is the top of the shoe. As more image information of an object is submitted, the image information is auto-correlated (and/or cross-correlated, combined, merged, or stitched together) with existing image information to enhance the overall quality of the model. To achieve a desired quality factor, the model may require many subsequent users to submit images. Once a desired model quality is achieved, the 3D image models could provide customers with multiple product views though many 3D images of a product seamlessly stitched together. It should be understood that the subject matter discussed herein, though presented in a retail environment, can also be applicable to various other catalogs, encyclopedias, indexes, or databases for organizing images and/or information.

Figure 4:
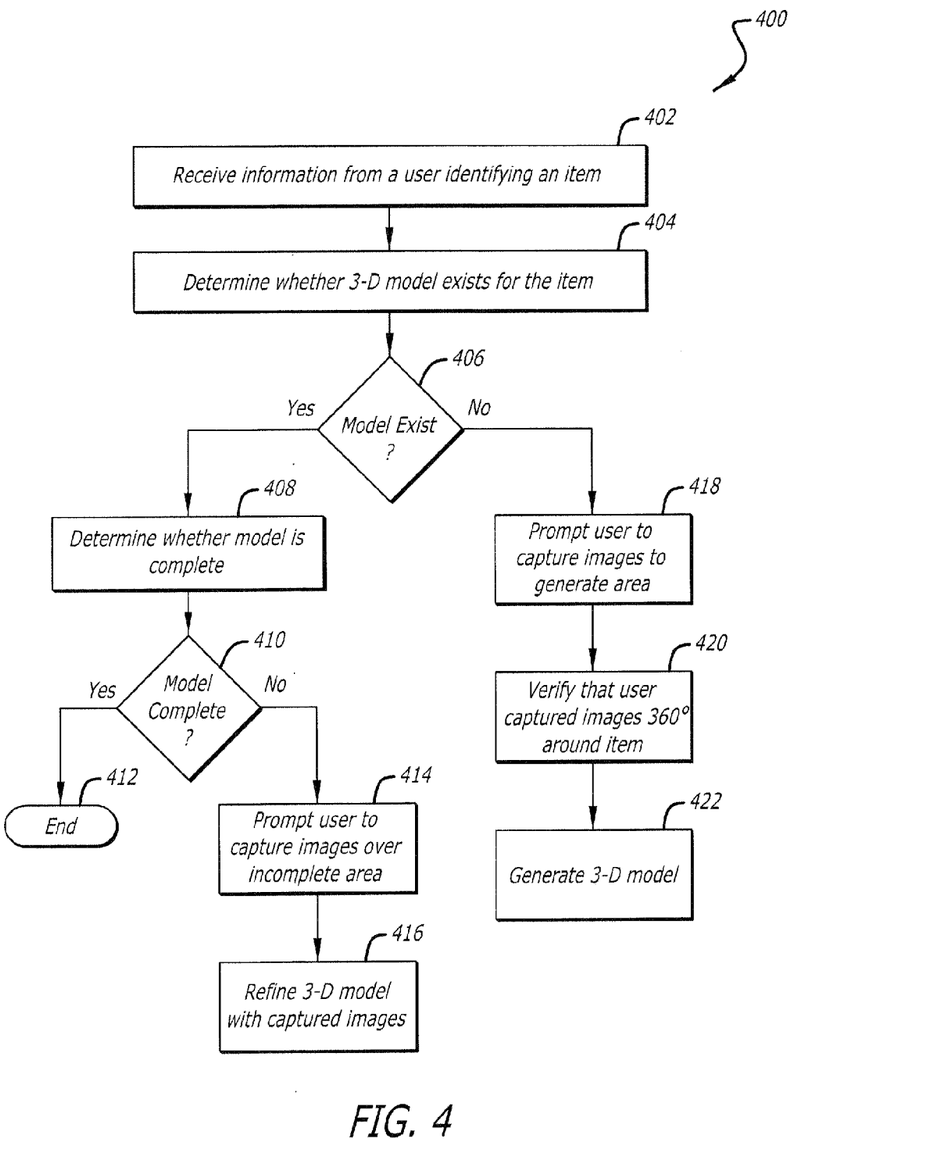
FIG. 4 illustrates an example process for generating a 3D model that can be used in accordance with at least one embodiment.

FIG. 4 illustrates an example process 400 for generating a model using a computing device that can be used in accordance with various embodiments. It should be understood that, for any process discussed herein, there can be additional, fewer, or alternative steps performed in similar or alternative orders, or in parallel, within the scope of the various embodiments unless otherwise stated. In this example, a system receives information or data from a user of a computing device that identifies an item or product 402. In this example, an object's barcode or some other object recognition tool can be used to uniquely identify the object. Upon identifying the item, the system determines whether a 3D model for the item exists 404. If a 3D model exists 406, the system determines whether the model is complete 408. If the model is complete 410, the system provides the model for display to the user 412. However, if the model is not complete 410, the system prompts the user to capture images over a determined incomplete area 414. In one example, the user could be prompted to capture images of the entire product to insure consistency of the model's color or hues and the additional images are auto-correlated with the existing model to, therefore, enhance the overall quality of, or refine, the model 416.

However, if a 3D model does not exist 406, the system can prompt the user to capture images of the product to generate the model 418. If the user accepts, the user captures images of the product and sends or uploads the captured images to a server of the system. Once uploaded, the system may analyzes the images to verify that the user has captured all the necessary angles of the product or item 420. In this example, the system then generates the 3D model from the user submitted images and stores the model in a database where it is made available to users. Various other approaches can be used as well as discussed or suggested elsewhere herein.

Figure 5:
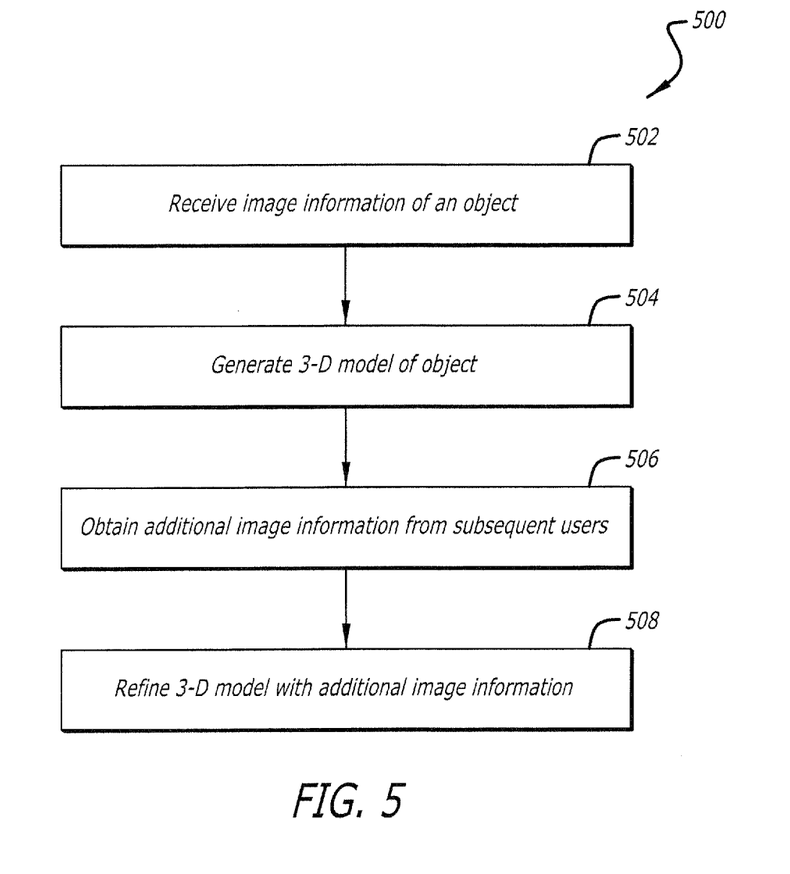
FIG. 5 illustrates another example process for generating a 3D model that can be used in accordance with at least one embodiment.
Figure 6A:
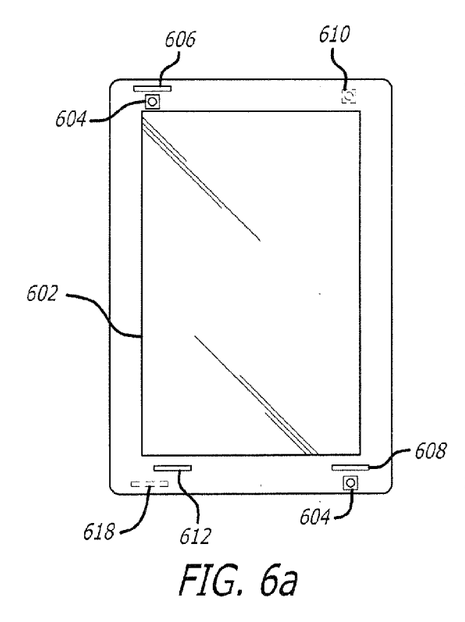
FIGS. 6(a) and 6(b) illustrate an example computing device that can be used to implement aspects of various embodiments.
Figure 6B:
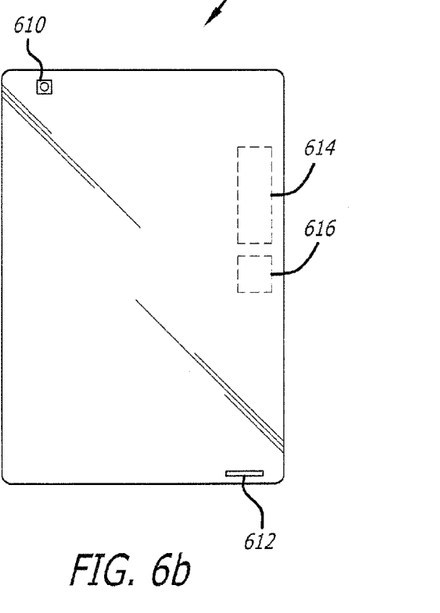

FIG. 5 illustrates an example process 500 for generating a model using a computing device that can be used in accordance with various embodiments. It should be understood that, for any process discussed herein, there can be additional, fewer, or alternative steps performed in similar or alternative orders, or in parallel, within the scope of the various embodiments unless otherwise stated. In at least some embodiments, image information captured with a computing device is received by a system from a first user for an object 502. The system uses the captured image information to generate a 3D model of the object 504. The system subsequently obtains additional image information from a set of additional users 506. With the additional image information submission from subsequent users, the system refines the model (by filling in gaps in the model, adding data points, improving color quality and image resolution, etc.) and continues to prompt additional users and further refine the model until a determined threshold is reached or a certain or defined quality factor is achieved.

In at least one embodiment, the images and image models are stored in a database or Wiki full of 3D models for products that users can access, add additional models thereto, and/or refine existing models. As more users contribute, the numbers of available models will grow and the overall quality of the models will improve as additional instances of a model are auto-correlated with existing models. The database can also be available to allow third parties to download or import into various applications.

In order provide the quasi-3D effect for a model on a two-dimensional display, various embodiments, in accordance with the present disclosure, capture 3D or stereoscopic image data with two or more imaging elements to capture images with depth information. In one embodiment, two different types of camera can be used to provide for stereo imaging. The first camera can be a relatively large, high resolution camera with a first aperture, with the second camera being a smaller camera having a lower resolution and a different aperture size. In at least some embodiments, the resolution and/or effective pixel size of the larger camera can be adjusted in order to better match the information in the lower resolution image. In order to compensate for different depths of focus for each camera, an appropriate aperture can be determined in order to have a similar depth of focus for each camera. Aperture sizes can be calculated that typically result in a larger aperture on the smaller camera than for conventional cameras of that size and/or resolution, as well as a potentially smaller aperture for the larger camera than for conventional cameras of that type on other electronic devices. By balancing the depths of focus, the image information can be combined in a way that will not generate significant false contours in the resulting 3D image information. Other stereoscopic camera configurations are also possible and can be utilized within the scope of various embodiments.

Figure 7:
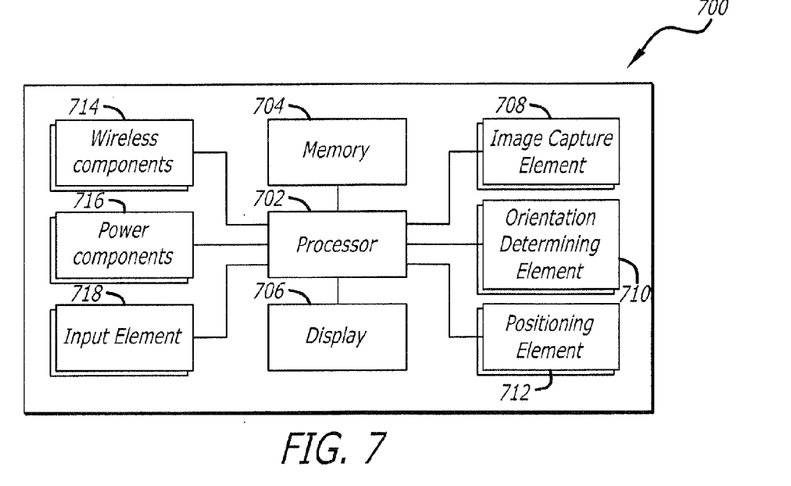
FIG. 7 illustrates example components that can be used with a device such as that illustrated in FIGS. 6(a) and 6(b)

FIGS. 7(a) and 7(b) illustrate front and back views, respectively, of an example electronic computing device 700 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 700 has a display screen 702 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 704 on the front of the device and at least one image capture element 710 on the back of the device. It should be understood, however, that image capture elements could also, or alternatively, be placed on the sides or corners of the device, and that there can be any appropriate number of capture elements of similar or different types. Each image capture element 704 and 710 may be, for example, a camera, a charge-coupled device (CCD), a motion detection sensor or an infrared sensor, or other image capturing technology.

As discussed, the device can use the images (e.g., still or video) captured from the imaging elements 704 and 710 to generate a three-dimensional simulation of the surrounding environment (e.g., a virtual reality of the surrounding environment for display on the display element of the device). Further, the device can utilize outputs from at least one of the image capture elements 704 and 710 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 708 on the front side, one microphone 712 on the back, and one microphone 706 on or near a top or side of the device. In some devices there may be only one microphone, while in other devices there might be at least one microphone on each side and/or corner of the device, or in other appropriate locations.

The device 700 in this example also includes one or more orientation- or position-determining elements 718 operable to provide information such as a position, direction, motion, or orientation of the device. These elements can include, for example, accelerometers, inertial sensors, electronic gyroscopes, and electronic compasses.

The example device also includes at least one communication mechanism 714, such as may include at least one wired or wireless component operable to communicate with one or more electronic devices. The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

Figure 8:
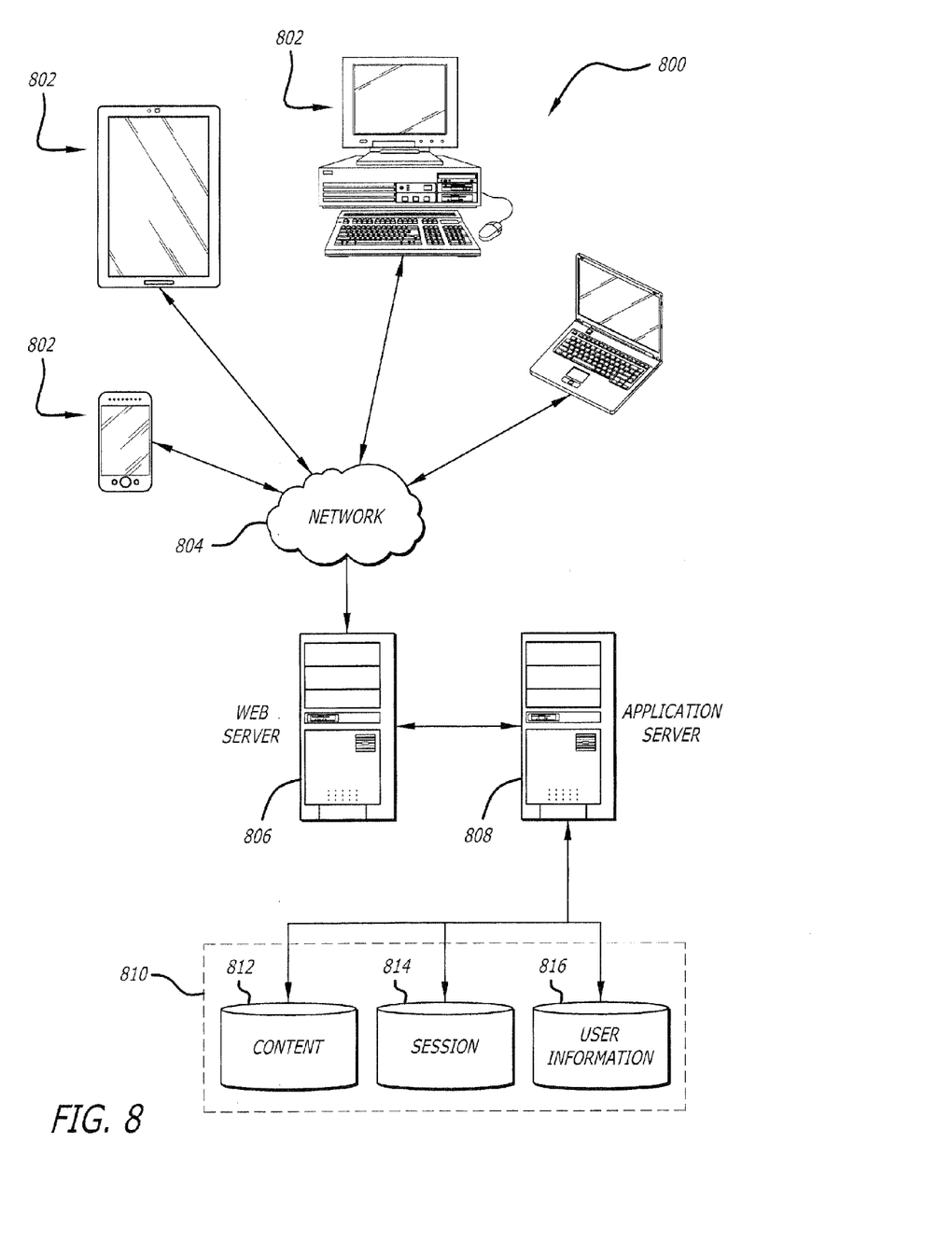
FIG. 8 illustrates an environment in which various embodiments can be implemented.

FIG. 8 illustrates a set of basic components of an electronic computing device 800 such as the device 700 described with respect to FIG. 7. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices. The device typically will include some type of display element 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation determining element 710 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a UPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element (s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 814 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 818 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope or the invention as set forth in the claims.

What is claimed is:

1. A computer-implemented method, comprising:
   under the control of one or more computer systems configured with executable instructions,
     presenting a display by a first portable computing device to capture a plurality of images of an item at different points of view relative to the item;
     receiving the plurality of images captured in response to the prompting;
     generating a three-dimensional model of the item using information obtained from the plurality of images;
     storing the three-dimensional model in a database containing a plurality of three-dimensional models;
     determining that the three-dimensional model does not meet at least one model criterion;
     presenting a second display by a second portable computing device to capture at least one image of a view of a same type of item; and
     generating an updated three-dimensional model with information obtained from the at least one image captured by the second portable computing device;
     wherein at least one of the presenting the display by the first portable computing device and presenting the second display by the second portable computing device comprises:
     presenting instructions on a display of the first portable computing device or on a display of the second portable computing device to position the first portable computing device or the second portable computing device relative to the item when the updated model is incomplete, the instructions based, at least in part, on orientation information obtained from the first portable computing device or the second portable computing device.

2. The computer-implemented method of claim 1, wherein at least one of the first portable computing device or the second computing device includes a first camera having a first field of view and a second camera having a second field of view, the second field of view at least partially overlapping the first field of view.

3. The computer-implemented method of claim 1, further comprising:
   presenting a third display by the first portable computing device, by the second portable computing device, or by a third personal computing device to capture additional images of the same type of item until a quality factor of the updated three-dimensional model exceeds a quality factor threshold.

4. The computer-implemented method of claim 1, further comprising:
   identifying a portion of the updated three-dimensional model for which a quality factor is below a quality factor threshold; and
   presenting instructions on the display of the first portable computing device or on the display of the second portable computing device to capture at least one image that includes a view of the item corresponding to the identified portion.

5. The computer-implemented method of claim 1, wherein the at least one model criterion includes a number of images used to generate the three-dimensional model, an image resolution of the model, or a number of data points of the model.

6. A computer-implemented method, comprising:
   under the control of one or more computer systems configured with executable instructions,
     receiving, from a portable computing device, information associated with an item;
     identifying a three-dimensional model of the item based on the received information associated with the item;
     receiving at least one image of the item captured with the portable computing device;
     generating an updated three-dimensional model with information obtained from the at least one image; and
     presenting instructions on a display of the portable computing device to position the portable computing device relative to the item where the updated three-dimensional model is incomplete, the instructions based, at least in part, on orientation information obtained from the portable computing device.

7. The computer-implemented method of claim 6, further comprising:
   presenting instructions on the display of the portable computing device to capture the at least one image of the item with the portable computing device.

8. The computer-implemented method of claim 7, further comprising:
   receiving orientation information indicating an orientation of the computing device at approximately the time the at least one image is captured;
   determining a type of view associated with the orientation; and
   presenting instructions on the display of the portable computing device to capture at least one additional image of a view of the item at an orientation different from the orientation associated with the determined type of view.

9. The computer-implemented method of claim 7, further comprising:
   presenting an additional display by an additional portable communications device to capture additional image views of the item until the updated three-dimensional model reaches a determined quality threshold.

10. The computer-implemented method of claim 6, wherein receiving information for the item includes receiving at least one of a barcode, a QR code, product identifier, an optical character recognizer, or by image information associated with the item.

11. The computer-implemented method of claim 6, wherein the item is a product available for consumption through an ecommerce website.

12. The computer-implemented method of claim 6, wherein the portable computing device includes a first camera having a first field of view and a second camera having a second field of view, the second field of view at least partially overlapping the first field of view.

13. A computing device, comprising:
   at least one processor; and
   memory including instructions that, when executed by the at least one processor, cause the computing device to:
      receive image information for an object captured with a computing device;
      generate a three-dimensional model of the object using the image information;
   presenting instructions to position the computing device relative to the object when the three-dimensional model is incomplete, the instructions based, at least in part, on orientation information obtained from the computing device;
      from each of a set of additional computing devices, obtain additional image information for the three-dimensional model; and
      refine the three-dimensional model using the additional image information until a quality factor reaches a quality factor threshold.

14. The computing device of claim 13, wherein the image information includes information from a first camera and a second camera of the computing device for generating a stereoscopic image of the model using depth information.

15. The computing device of claim 13, wherein the set of additional computing devices display instructions to capture the additional image information of the item until the quality factor of the three-dimensional model reaches the quality factor threshold.

16. The computing device of claim 13, wherein refining the three-dimensional model using the additional image information includes at least one of filling in gaps in the model, adding data points to the model, or improving quality of the model.

17. The computing device of claim 13, wherein the object is a product available for consumption through an ecommerce website.

18. The computing device of claim 13, wherein the quality factor includes at least one of a number of images used to generate the three-dimensional model, an image resolution of the model, or number of data points of the model.

19. A non-transitory computer-readable storage medium storing instructions that, when executed by at least one processor of a computing device, cause the computing device to:
   receive, from a portable computing device, information associated with an item;
   identify a three-dimensional model of the item based on the received information associated with the item;
   receive at least one image of the item captured with the portable computing device;
   update the three-dimensional model with information obtained from the at least one image; and
   present instructions on a display of the computing device to position the computing device relative to the item where the three-dimensional model is incomplete, the instructions are based, at least in part, on orientation information obtained from the computing device.

20. The non-transitory computer-readable storage medium of claim 19, wherein the instructions that, when executed by the at least one processor of the computing device, further cause the computing device to:
   present instructions on the display of the computing device to capture at least one image of the item with the computing device.

21. The non-transitory computer-readable storage medium of claim 19, wherein the image information includes information from a first camera and a second camera of the computing device for generating a stereoscopic image of the model using depth information.

22. The non-transitory computer-readable storage medium of claim 19, wherein receiving information for the item includes receiving at least one of a barcode, a QR code, product identifier, an optical character recognizer, or image information associated with the item.

23. The non-transitory computer-readable storage medium of claim 19, wherein the item is a product available for consumption through an ecommerce website.

24. The computer-implemented method of claim 1, wherein the second portable computing device is the first portable computing device or a third portable computing device.

* * * * *